UNITED STATES PATENT OFFICE.

JOVITA BOYD THOMPSON, OF DENTON, TEXAS.

PROCESS OF SKINNING FRUIT.

No. 843,311. Specification of Letters Patent. Patented Feb. 5, 1907.

Application filed January 4, 1906. Serial No. 294,557.

*To all whom it may concern:*

Be it known that I, JOVITA BOYD THOMPSON, a citizen of the United States of America, and a resident of Denton, in the county of Denton and State of Texas, have invented certain new and useful Improvements in Processes of Skinning Fruit, of which the following is a specification.

Generally the invention herein described relates to the process of peeling or skinning fruit—as, for example, peaches, pears, plums, and apples.

More particularly it relates to a process of hygienic treatment of the fruit so that the skins may be removed quickly by chemical means without in any manner unhealthfully injuring the fruit and without leaving any trace of an unwholesome chemical.

Before setting forth the exact steps to be followed in carrying out the invention I will by explicit language distinguish what is old. As formerly practiced the skinning of fruit has been carried on by the use of alum for neutralizing the alkalinity of potassic or sodic hydrate. Many authorities consider alum injurious to health. Minute quantities improve the appearance of bread made from inferior flour; but, according to the *Encyclopedia Britannica*, Vol. III, page 255, "the use of alum is regarded as an adulteration, and heavy penalties have been imposed on its detection."

As in the treatment of fruit while skinning the same small quantities are apt to be left behind in the pores of the fruit, I have invented a process which is independent of the employment of alum.

As the invention is independent of any particular apparatus and consists entirely of chemical operations, no drawings are annexed.

I will now describe the process in such full, clear, and concise terms as to enable any person skilled in the art to use the same.

The first step consists in subjecting the whole fruit, preferably without cutting or pitting it, to the action of a solution, in water, of an alkali, which may conveniently be caustic soda or caustic potash. If first pitted or sliced, the solution washes out practically all of the acidity and juices of the fruit. The flavor of the fruit is lost also. Caution should be taken, therefore, not to pit or cut up the fruit until after the whole chemical treatment. To hasten the action of the chemical upon the skin, the said solution is maintained at the boiling-point. The time is around a minute, more or less, according to the strength of the solution; but the operator may know when the time is sufficient by the appearance of the fruit. It breaks and furrows up. I do not confine myself to any particular strength of solution; but I found by experiment that the usual stick of the potash, as found on the market, suffices for one gallon. In this respect, however, my invention corresponds to the old process, where the first step consists in the action of caustic potash or similar alkali. I find, also, that instead of the alkali carbonate of soda is suitable for this first step, or carbonate of potassium may be employed. Conveniently, a boiling solution of ordinary hard-wood ashes may be used economically.

The next step consists in removing the solution from the fruit or the fruit from the solution and treating the fruit with a stream of cold water thrown forcibly upon the fruit and copiously, or the fruit may be taken out of the alkali solution and immersed in cold running water. The object of this last-mentioned step is to remove the skin and as much of the alkali as possible by means of the water.

The third step consists in subjecting the fruit after removal from the water-bath to the action of very diluted acetic acid. As this acid is found to the extent of five per cent. in ordinary vinegar, it is evident that it is not deleterious to one's health. Precaution should aim at completely neutralizing the alkali, which may be known by a piece of litmus-paper, which should show red preferably, as it is much better to have a little excess of the acid than of the alkali. After this step the fruit is washed or rinsed in cold water again. Any trace of the acid will not be unhealthful.

The addition of acetic acid to the remaining alkali will produce an acetate. If the alkali is potash, for example, the compound will be potassic acetate, which has been used as a medicine, and hence any trace left will not be injurious, and similarly sodic acetate has been used as a medicine according to *Roscoe and Schorlemmer's Chemistry*, Vol. III, part I, pages 496 and 498 of the edition of 1882.

My invention may be modified without departing from the spirit thereof—namely, to use dilute citric acid in the place of acetic acid. This is not as preferable, but is mentioned to show that I include, broadly, the conception of an acid in place of alum for neutralizing the effects of the alkali.

I claim as my invention—

1. The hereinbefore-described process of skinning fruit, consisting in subjecting the fruit to the action of lye, washing off the skins and as much of the lye as possible from the fruit, then subjecting the fruit to the action of acetic acid to neutralize the remaining lye, and then rinsing the fruit.

2. The hereinbefore-described process of skinning fruit, consisting in subjecting the fruit to the action of caustic soda until the skin is loose and furrowed, washing off the skins, and the soda as far as possible with water, subjecting the fruit to the action of acetic acid until the remaining soda is neutralized, and finally rinsing the fruit with water.

In testimony whereof I have signed my name to this specification, in the presence of two subscribing witnesses, at Denton, Texas, this 26th day of December, 1905.

JOVITA BOYD THOMPSON.

Witnesses:
J. C. COIT,
J. H. JAQUES.